(12) United States Patent
Curtis et al.

(10) Patent No.: US 10,998,685 B2
(45) Date of Patent: May 4, 2021

(54) SINGLE PAIR ETHERNET CONNECTOR SYSTEM

(71) Applicant: CISCO TECHNOLOGY, INC., San Jose, CA (US)

(72) Inventors: George Edward Curtis, San Jose, CA (US); Amrik S. Bains, Livermore, CA (US); Edward John Kliewer, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/184,430

(22) Filed: Nov. 8, 2018

(65) Prior Publication Data
US 2020/0153174 A1    May 14, 2020

(51) Int. Cl.
| | |
|---|---|
| *H01R 4/50* | (2006.01) |
| *H01R 24/64* | (2011.01) |
| *H01R 13/627* | (2006.01) |
| *H01R 25/00* | (2006.01) |
| *H01R 13/717* | (2006.01) |
| *H01R 4/18* | (2006.01) |
| *H01R 107/00* | (2006.01) |

(52) U.S. Cl.
CPC ............ *H01R 24/64* (2013.01); *H01R 4/184* (2013.01); *H01R 13/6272* (2013.01); *H01R 13/7175* (2013.01); *H01R 25/006* (2013.01); *H01R 2107/00* (2013.01)

(58) Field of Classification Search
CPC .................................................... H01R 24/62
USPC .................................................... 439/344, 76
See application file for complete search history.

(56) References Cited

U.S. PATENT DOCUMENTS

| | | | |
|---|---|---|---|
| 6,259,745 B1 | 7/2001 | Chan | |
| 6,623,275 B1 * | 9/2003 | Pavlovic | ............ H01R 13/7197 439/38 |
| 7,835,389 B2 | 11/2010 | Yu et al. | |
| 7,940,787 B2 | 5/2011 | Karam | |
| 8,714,994 B2 * | 5/2014 | Daily | ..................... H01R 24/64 439/344 |
| 9,189,043 B2 | 11/2015 | Vorenkamp et al. | |
| 10,007,628 B2 | 6/2018 | Pitigoi-Aron et al. | |
| 2016/0308683 A1 | 10/2016 | Pischl et al. | |
| 2016/0352535 A1 | 12/2016 | Hiscock et al. | |
| 2016/0365967 A1 | 12/2016 | Tu et al. | |
| 2018/0060269 A1 | 3/2018 | Kessler | |
| 2018/0102604 A1 | 4/2018 | Keith et al. | |

* cited by examiner

*Primary Examiner* — Phuong K Dinh
(74) *Attorney, Agent, or Firm* — Cindy Kaplan

(57) ABSTRACT

In one embodiment, an apparatus includes a connector plug for attachment to a single pair Ethernet cable comprising a pair of conductors, and configured for being received in a connector receptacle. The connector plug includes a first end for receiving the single pair Ethernet cable and a second end having a pair of contacts, each of the contacts comprising a receptacle contact interface, a conductor interface, and an extension to provide an increased width between conductor gripping prongs at the conductor interface while maintaining a consistent spacing between the pair of contacts at the receptacle contact interface with connector plugs configured to mate with different gauge cables.

7 Claims, 17 Drawing Sheets

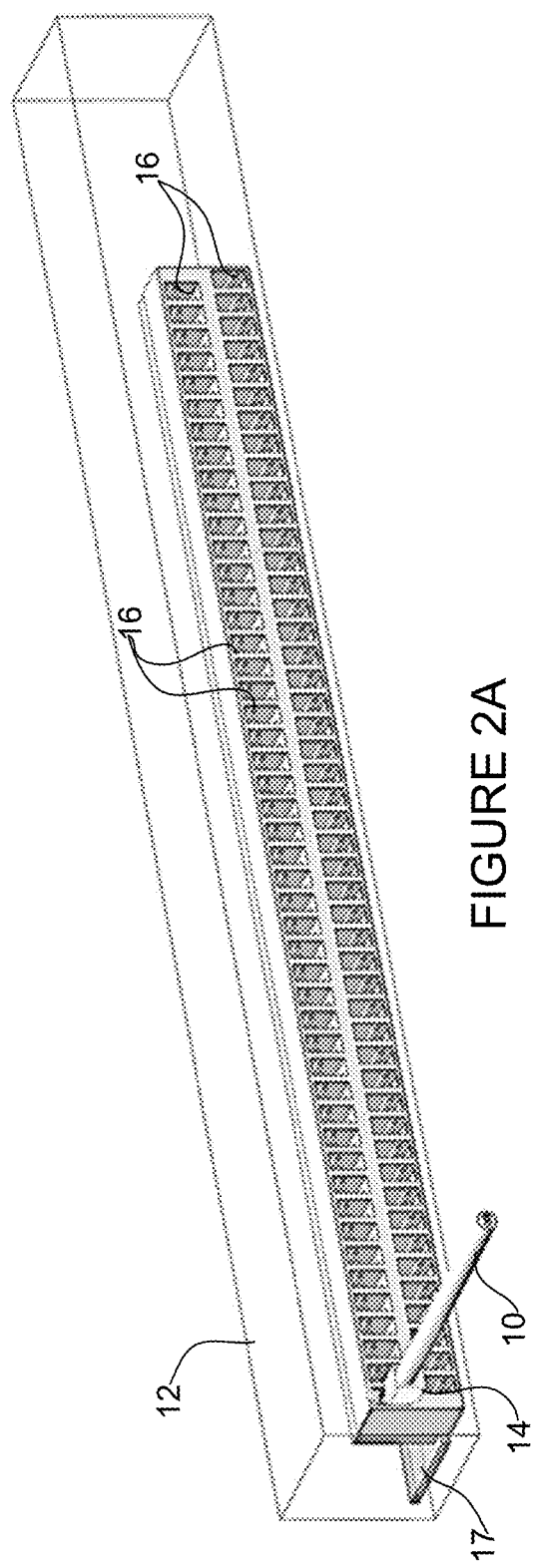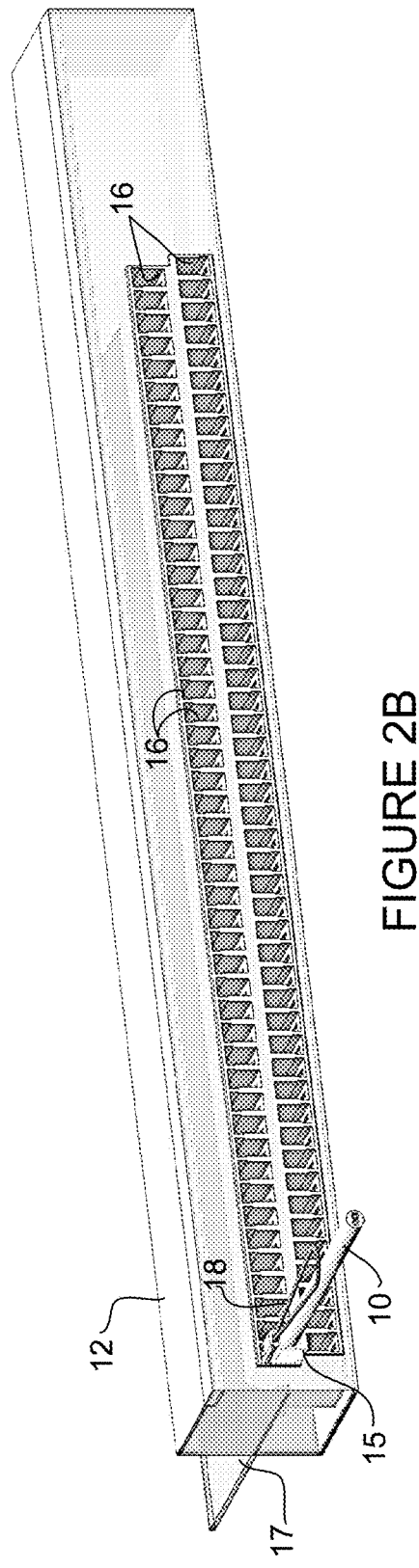
FIGURE 2A
FIGURE 2B

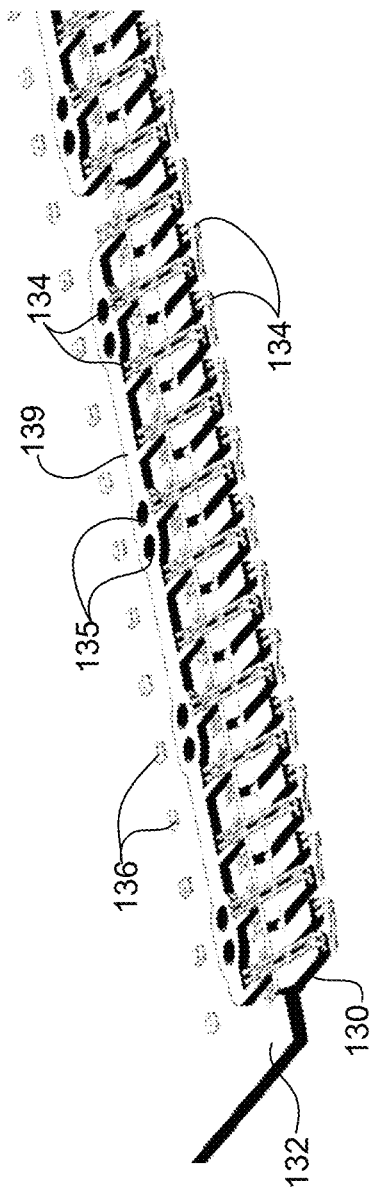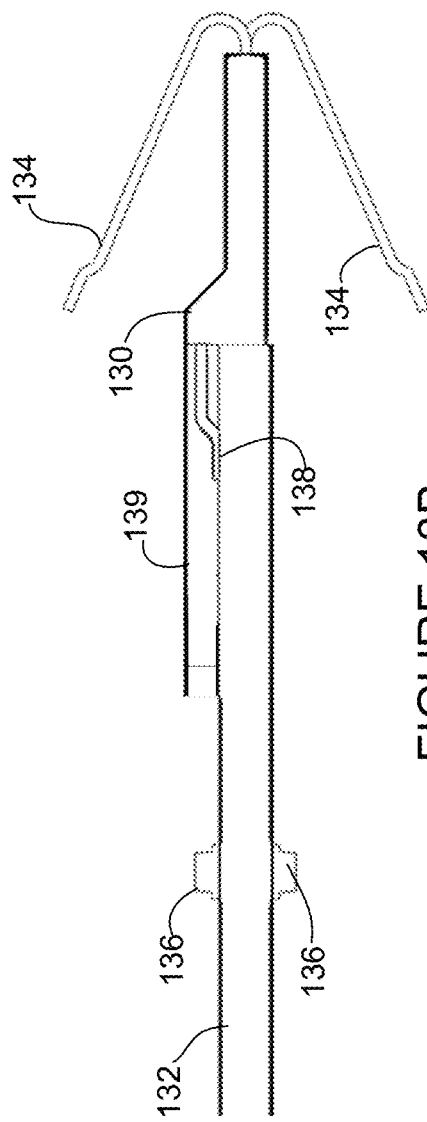
FIGURE 13A
FIGURE 13B

US 10,998,685 B2

SINGLE PAIR ETHERNET CONNECTOR SYSTEM

TECHNICAL FIELD

The present disclosure relates generally to network connectors, and more particularly, to Single Pair Ethernet (SPE) connector systems.

BACKGROUND

Conventional Ethernet cabling uses 4-pair cables with RJ45 connectors to transmit data over networks and deliver low power via Power over Ethernet (PoE). With the growth of Internet of Things (IoT) along with industrial and automotive applications, interest has increased for Single Pair Ethernet (SPE). Since most IoT devices require very little bandwidth as compared to typical data applications using traditional 4-pair cabling, SPE provides a more compact and economical solution. Conventional RJ45 connectors do not support SPE cables.

BRIEF DESCRIPTION OF THE DRAWINGS

FIG. 2A shows the network device interface of FIG. 1A with only one of the latch SPE plug and cable assemblies inserted into a receptacle.

FIG. 2B shows the network device interface of FIG. 1B with only one of the pull cord SPE plug and cable assemblies inserted into the receptacle.

FIG. 13A is a perspective illustrating receptacle contacts attached to a printed circuit board in a process for attaching a receptacle housing to the printed circuit board, in accordance with one embodiment.

FIG. 13B is a side view of the printed circuit board assembly shown in FIG. 13A.

Corresponding reference characters indicate corresponding parts throughout the several views of the drawings.

DESCRIPTION OF EXAMPLE EMBODIMENTS

Overview

Figure 1A:
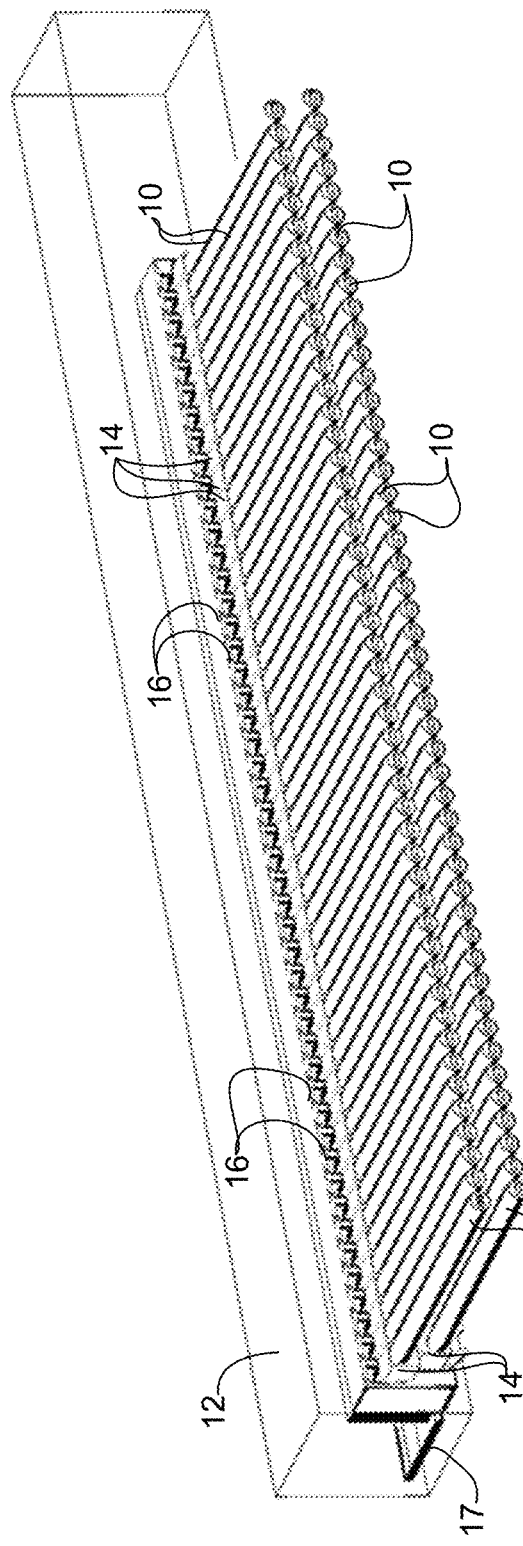
FIG. 1A illustrates a plurality of latch SPE plug and cable assemblies connected to a plurality of receptacles at a network device interface, in accordance with one embodiment.

In one embodiment, an apparatus generally comprises a connector plug for attachment to a single pair Ethernet cable comprising a pair of conductors, and configured for being received in a connector receptacle. The connector plug includes a first end for receiving the single pair Ethernet cable and a second end having a pair of contacts, each of the contacts comprising a receptacle contact interface, a conductor interface, and an extension to provide an increased width between conductor gripping prongs at the conductor interface while maintaining a consistent spacing between the pair of contacts at the receptacle contact interface with connector plugs configured to mate with different gauge cables.

In one or more embodiments, the single pair Ethernet cable comprises an 18 AWG (American Wire Gauge) cable and spacing between the pair of contacts at the receptacle contact interface is consistent with a connector plug configured for attachment to a 26 AWG cable. In one or more embodiments, external dimensions of the connector plug are consistent with external dimensions of the connector plug configured for attachment to the 26 AWG cable.

In one or more embodiments, the single pair Ethernet cable carries Power over Ethernet (PoE).

In one or more embodiments, the connector plug comprises a latch for secure attachment to the receptacle, the latch connected to a tab accessible when the connector plug is inserted into the receptacle for release of the connector plug. In one or more other embodiments, the connector plug comprises a latch for secure attachment to the receptacle and a pull cord connected to the latch and accessible when the connector plug is inserted into the receptacle with a plurality of other connector plugs for release of the connector plug.

In one or more embodiments, each of the contacts comprises at least three of the conductor gripping prongs, spacing between the prongs is defined by a U-shaped extension, and the gripping prongs are crimped onto the conductors of the single pair Ethernet cable using insulation displacement.

In one or more embodiments, the spacing between the pair of contacts at the receptacle contact interface is approximately 0.04 in.

In another embodiment, an apparatus generally comprises a plurality of receptacles for receiving plugs attached to single pair Ethernet cables, the receptacles integrally formed within a housing for attachment to a printed circuit board, and a plurality of contact sets. The contact sets are connected on one side of the printed circuit board and positioned with every other set of contacts extending upward and the contact sets interposed therebetween extending downward for insertion into the receptacles when the housing is positioned on the printed circuit board.

In one or more embodiments the housing further comprises a plurality of light pipes positioned adjacent to light generating devices on an upper side and a lower side of the printed circuit board for transmitting light to the plugs when inserted into the receptacles. Mounting pins may be attached to the light pipes for securely connecting the housing to the printed circuit board.

In one or more embodiments, the apparatus further comprises a bracket for positioning the contact sets on the printed circuit board. The bracket may include openings for receiving the mounting pins for attaching the housing to the printed circuit board.

In yet another embodiment, an apparatus generally comprises a plurality of receptacles for receiving plugs attached to single pair Ethernet cables, the receptacles integrally formed within a housing for attachment to a printed circuit board, a plurality of contact sets, and a plurality of light pipes attached to the housing and positioned adjacent to light generating devices on an upper side and a lower side of the printed circuit board for transmitting light to the plugs when inserted into the receptacles when the housing is attached to the printed circuit board.

In one or more embodiments, mounting pins are attached to the light pipes, the light pipes and mounting pins moveable between a first position for sliding the housing onto the printed circuit board and a second position for securely connecting the housing to the printed circuit board.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Traditional 4-pair copper cables connect to network devices using RJ45 connectors. With the growing need to provide cost effective power, data connectivity, and security to the large number of end point devices that will be deployed in the future, Single Pair Ethernet (SPE) has emerged as a promising technology. SPE enables data transmission over Ethernet via a single pair of wires while also providing a power supply to end devices (e.g., Power over Ethernet (PoE), Power over Data Line (PoDL)) to pass electrical power along with data to allow a single cable to provide both data connectivity and electrical power to end point devices. New Ethernet applications are planned for use with single pair copper cables in the Enterprise, industrial applications, automotive Ethernet, and IoT devices (e.g., sensors, actuators, appliances, vehicles, lighting, health care monitoring devices, traffic control, phones, video cameras, point-of-sale devices, security access control devices and systems, residential devices, building and home automation, energy management, manufacturing equipment, smart systems, and many more applications). For low cost and compact electronics that consume little power, SPE provides numerous advantages over conventional systems.

In order to provide wide acceptance and usage of SPE across different industries, a single pair connector is needed that supports various cable gauges, speeds, and power applications, can be shielded or unshielded, and has a reduced frontal area as compared to conventional RJ45 connectors.

The embodiments described herein provide an end-to-end connector and cable system that supports SPE for different cable gauges and speeds while providing a reduced frontal area for increased cable density and a consistent interface for the different cable gauges. In one or more embodiments, a common connector interface is provided for a range of cable gauges including SPE 18 AWG (American Wire Gauge) to 26 AWG cables with a reduced size to allow for an increased number of ports on a network device, with shielded or unshielded cable. In one or more embodiments a plug of the connector may be attached to the cable using field termination with a crimping tool similar to a tool used for conventional 4-pair cables. The embodiments described herein may be used in the telecommunications industry, computer industry, automotive industry, or other industries. As described in detail below, in one or more embodiments the connector system includes a connector (mating plug and receptacle) and receptacle housing assembly.

The embodiments described herein may operate in the context of a data communications network including multiple network devices. The network may be configured for PoE and include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, Internet of Things (IoT) network, radio access network, public switched network, or any other network).

In one example, the network may use conventional 4-pair cables with break-out at a switch (or other network device) to a plurality of devices using a single pair cable for each end device. The connector system described herein provides for single pair Ethernet (SPE) communications between devices (e.g., switch and IoT device or other device configured for single pair Ethernet operation). The switch may be in communication with any number of end devices and may also provide power to one or more of the devices over the single pair Ethernet cable. The switch may comprise any number of ports (receptacles) for receiving plugs connected to the single pair Ethernet cables. The embodiments described herein provide an SPE connector system comprising the SPE receptacles and the SPE plugs along with a receptacle housing assembly for attaching a plurality of the receptacles to a printed circuit board at the network device for use in an SPE network system.

Referring now to the drawings and first to FIG. 1A, an example illustrating 96 cables 10 connected to a network device 12 is shown. For simplification only an interface at the network device (e.g., switch or other device) is shown, along with only a portion of a printed circuit board (PCB) 17, and the cables 10 are cut in cross-section. The cables 10 are connected to the network device 12 with a connector (connection, coupling, connector assembly) formed from a plug 14 (also referred to as a male connector) and a receptacle 16 (also referred to as a port, jack, receiver, or female connector) coupled together. As shown in FIG. 1A, the plug 14 is attached to the cable 10 and received in the receptacle 16 attached to the network device 12. The connection may be used for connecting communications equipment through cables configured to carry both data and power, for example. Signals may be exchanged among communications equipment or devices and power transmitted from power sourcing equipment to powered devices. In one or more embodiments, the connector may be used in a PoE, PoE+, PoDL or other power over communications cable system. The connector system may also include appropriate safety features as needed for higher power PoE (e.g., insulation, process for power/cable compatibility confirmation, control circuit check for open/short, or thermal sensor). As described below, the SPE connector is configured with a small form factor that allows for an increased number of ports as compared to conventional 4-pair connectors. In one example, 96 ports are located on a 1 RU (router unit) network device with space provided for traditional uplink modules on a front face.

The cable 10 is configured for single pair Ethernet and comprises two conductors (copper wires). The cable 10 may be configured according to a standard cable gauge and rated for one or more power or current levels, a maximum power level, a maximum temperature, or identified according to one or more categories indicating acceptable power level usage, for example. In one example, the cables 10 correspond to a standardized wire gauge system such as AWG (American Wire Gauge). For different gauge wire, AWG provides data including diameter, area, resistance per length, ampacity (maximum amount of current a conductor can carry before sustaining immediate or progressive deterioration), and fusing current (how much current it takes to melt a wire in free air). Various other standards (e.g., NEC (National Electrical Code), UL (Underwriters Laboratories)) may be used to provide various requirements for the cables and connectors and provide temperature or power ratings or limits, or other information.

A cable assembly comprises the plug portion 14 of the connector and the cable 10 extending from one end of the plug for transmitting and receiving data and transmitting power (FIG. 1A). The other end of the cable also includes the plug 14. In one or more embodiments, the receptacle (cavity, opening) 16 is formed in a receptacle (port) housing (described below with respect to FIG. 14) for receiving a free end of the plug 14. The receptacle housing may be mounted onto a board 17 (e.g., printed circuit board (PCB)) using any suitable connection means. One example for connecting the receptacle housing to the PCB 17 is described below with respect to FIGS. 13-16A.

Figure 4A:
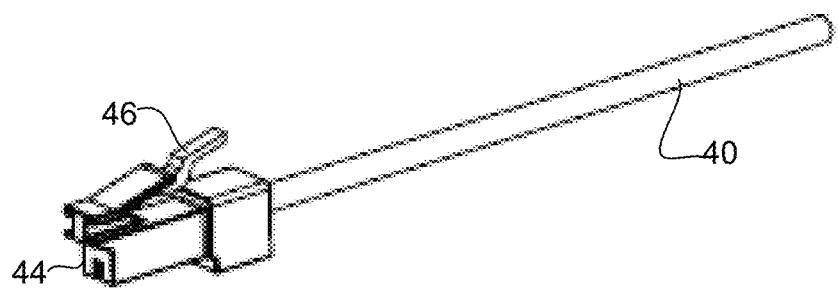
FIG. 4A is a perspective of a 26 AWG cable with a latch SPE plug, in accordance with one embodiment.
Figure 4B:
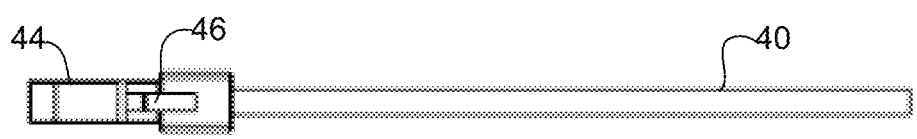
FIG. 4B is a top view of the plug and cable assembly shown in FIG. 4A.
Figure 4C:
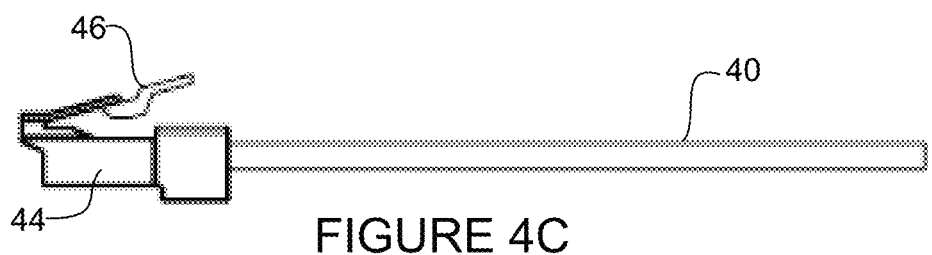
FIG. 4C is a side view of the plug and cable assembly shown in FIG. 4A.
Figure 4D:
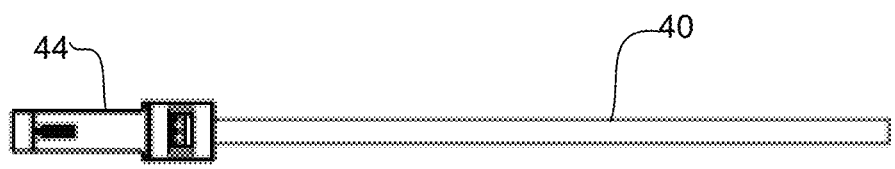
FIG. 4D is a bottom view of the plug and cable assembly shown in FIG. 4A.

In the example shown in FIG. 1A, the plug 16 comprises a resilient latch (tab) that allows for removal by pressing on the latch (similar to RJ45 connectors). The tab (shown in FIG. 4A and described below) is configured to rest against an inner surface of the receptacle 16 to lock the plug 14 in place. In one or more embodiments, the latch provides an audible click when engaged. The tab extends rearward from the port and is thus accessible upon insertion of the plug 14 into the receptacle 16. The plug 14 (referred to herein as a latch plug or SPE latch plug) may be used, for example, when there is access to the plug to physically unlatch the plug from the receptacle (e.g., 2×N arrangement (2 rows and N columns)).

Figure 1B:
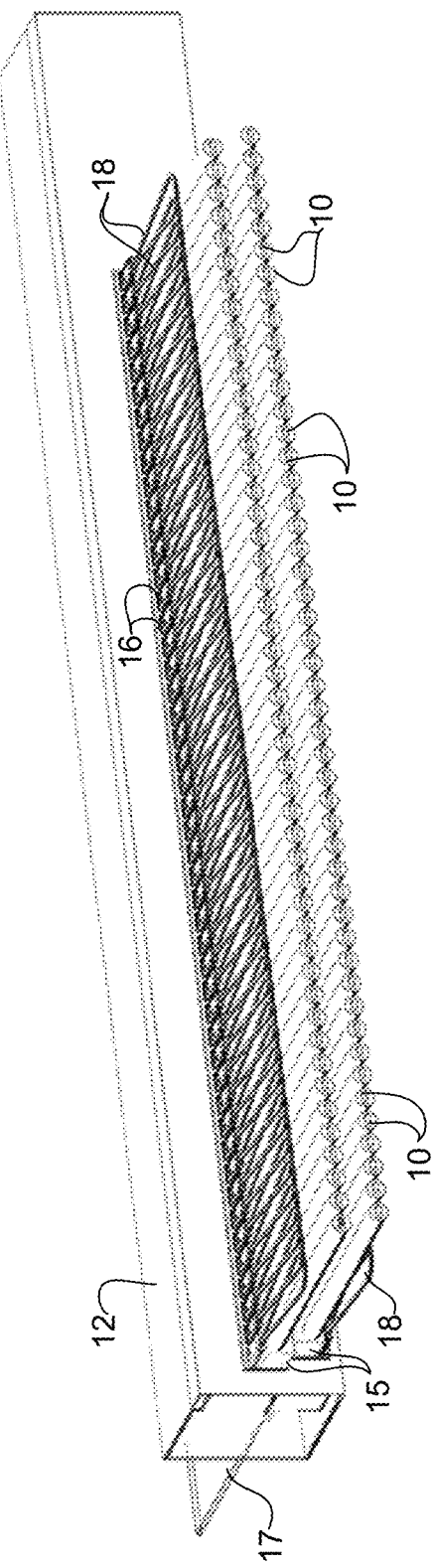
FIG. 1B illustrates a plurality of pull cord SPE plug and cable assemblies connected to the plurality of receptacles at the network device interface, in accordance with one embodiment.

In another embodiment shown in FIG. 1B, a plug 15 (referred to herein as a pull cord plug or SPE pull cord plug) comprises a pull cord release 18 to allow for easy removal in highly densely populated implementations. As described further below with respect to FIG. 7A, the pull cord 18 is attached to a latch and is used to release the latch from the receptacle. The pull cord latch may also provide an audible click when engaged. It may be noted that while both plug configurations shown in FIGS. 1A and 1B comprise a latch, the plug configuration 14 shown in FIG. 1A is referred to herein as a latch plug and the plug configuration 15 shown in FIG. 1B is referred to herein as a pull cord plug to differentiate between the two configurations. The pull cord 18 provides the capability to remove the connector if there are more than two rows of receptacles (e.g., 3×N configuration (3 rows by N columns)) in which case it may be difficult to physically access the latch or a tab connected to the latch as in plug 14, to release the plug from the receptacle.

FIGS. 2A and 2B show the receptacle housing with only one plug and cable assembly inserted. FIG. 2A shows the latch plug 14 and cable 10 and FIG. 2B shows the pull cord plug 15 and cable 10. As previously noted, the front face (interface) plate includes space for uplink modules (e.g., conventional RJ45 ports, or other interface modules) (not shown) at one end of the face plate. The face plate may also be configured with the uplink modules located in another location. In one or more embodiments, 96 ports are configured to fit in a conventional 19" 1 RU chassis, while providing room for uplink modules. As previously noted, the face plate at the network device 12 may be configured for receiving any number or arrangement of SPE connectors (e.g., 1×1, 2×1, 2×2, 2×4, 2×6, 2×N, 3×1, 3×2, 3×4, 3×6, 3×N . . . ).

The receptacle housing is attached to a circuit board, which may be mounted on a switch, for example. The printed circuit board (PCB) 17 (partially shown in FIGS. 1A, 1B, 2A, and 2B) extends rearward from the receptacle housing. In one or more embodiments, the PCB 17 is located between the two rows of receptacles 16 as shown in FIGS. 1B and 2B and described below with respect to FIG. 14. The PCB may also be located along one edge of the receptacle housing as shown in FIGS. 1A and 2A.

It is to be understood that the network device configuration and arrangement of SPE connectors shown in FIGS. 1A, 1B, 2A, and 2B is only an example and that any number of ports may be provided in the receptacle housing and in any arrangement for receiving a corresponding number of plug and cable assemblies. The receptacle housing may support arrays of multiple ports side-by-side or layers of ports stacked one on top of the other.

As described in detail below, the connector increases port density on the network device and provides a common interface (e.g., same external dimensions and contact/pin spacing (pitch) for different gauge cable (e.g., 18 AWG to 26 AWG) supporting single pair Ethernet. In one or more embodiments, the connectors support 10M/1G/2.5G/5G, and 10G speeds and IEEE 802.3bt Power-over-Single Pair (e.g., at least 2 amps per connector). In one or more embodiments, the receptacle housing comprises light pipes for transmitting light from the PCB to the plug to provide a visual indication of port status, as described below.

Figure 3A:
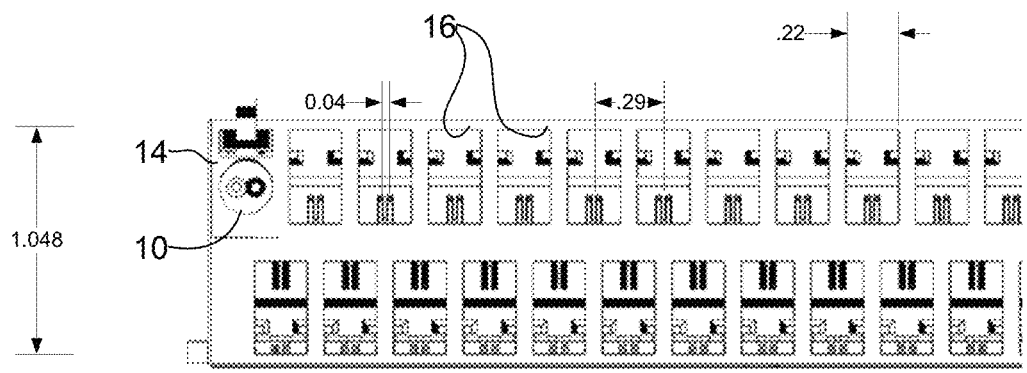
FIG. 3A is a front view of a portion of the network device interface shown in FIG. 2A with example dimensions for receptacles.
Figure 3B:
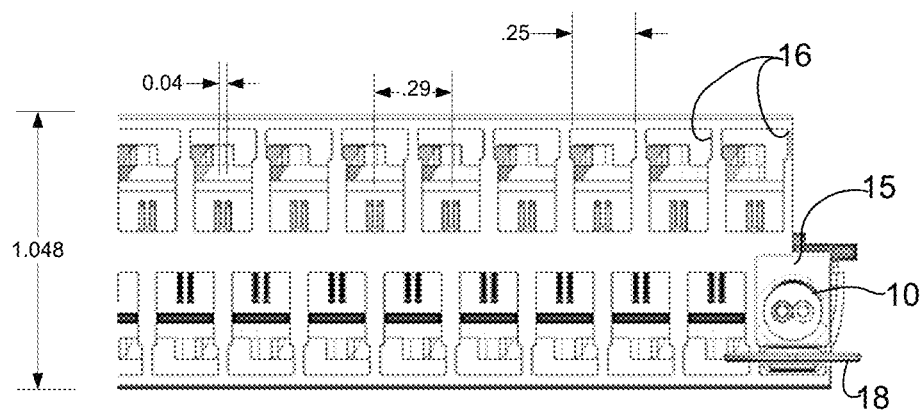
FIG. 3B is a front view a portion of the network device interface shown in FIG. 2B.

FIGS. 3A and 3B are partial front views showing dimensions of the receptacles 16, in accordance with one embodiment. FIG. 3A shows the latch plug 14 and cable 10 assembly (with a cross-section of the cable shown) inserted into one of the ports as shown in FIG. 2A. FIG. 3B shows the pull cord plug 15 and cable 10 assembly inserted into one of the receptacles 16 (with a cross-section of the cable shown). In the example shown in FIGS. 3A and 3B, the receptacles 16 are integrally formed in the receptacle housing and arranged in two rows. As previously noted, the receptacle housing may be configured with any number of ports or rows. As described below with respect to FIGS. 12A-12C, an individual receptacle may be provided for a 1×1 connection on a sensor or other IoT device.

In the example shown in FIGS. 3A and 3B, the receptacle housing may be about 14.093 inches wide and have a height of about 1.048 in. Each receptacle 16 may have, for example, a width of 0.22 in., with a center-to-center distance between adjacent receptacles in a row of 0.29 in. The pitch (wire contact spacing) in this example is 0.04 in. As described below, the pitch remains the same between different SPE cable sizes (e.g., 18 AWG-26 AWG). It is to be understood that these dimensions are only provided as examples and different dimensions may be used without departing from the scope of the embodiments.

Referring now to FIGS. 4A-4D and 5A-5D, a perspective, top view, side view, and bottom view are shown of the plug and cable assembly, in accordance with one embodiment. FIGS. 4A-4D illustrate a plug 44 attached to a 26 AWG cable 40 and FIGS. 5A-5D illustrate a plug 54 attached to an 18 AWG cable 50. The plug 44, 54 includes an insulating body supporting two conductive contacts, which are connected to corresponding conductors of the SPE cable 40, 50, as described below with respect to FIGS. 6C and 6D.

The connector plug 44, 54 includes a first end for receiving the single pair Ethernet cable 40, 50 and a second end comprising a pair of contacts for mating with a pair of receptacle contacts when the plug is inserted into the receptacle. In the example shown in FIGS. 4A-4D and 5A-5D, the first end (cable input end) comprises a cavity for receiving the dual conductor cable 40, 50 and the second end comprises a resilient locking tab 46 integrally connected by a flexible hinge to the free end of the plug and extending obliquely rearward therefrom. The tab 46 extends from a body of the plug in a flexible hinged manner and is shown in a relaxed position in FIGS. 4A and 5A. The tab 46 may be integrally molded with a main body of the plug 40, 50 or attached thereto and have various configurations (size, width, cross-section, shape, etc.).

It is to be understood that the terms rear (or rearward), front, upper, lower, and the like as used herein are relative terms and the orientation of the plug may vary based on installation of the connector.

In the examples illustrated herein, the plug is shown attached to an 18 AWG cable or a 26 AWG cable. It is to be understood that these are only examples. In one or more embodiments, the plug is configured to mate with a cable having a conductor diameter corresponding to an 18 AWG, 19 AWG, 20 AWG, 21 AWG, 22 AWG, 23 AWG, 24 AWG, 25 AWG, or 26 AWG cable. The conductor diameter for this range of cable gauges is shown in Table I:

TABLE I

| AWG | CONDUCTOR DIAMETER (Inches) |
|---|---|
| 18 | 0.0403 |
| 19 | 0.0359 |
| 20 | 0.032 |
| 21 | 0.0285 |
| 22 | 0.0253 |
| 23 | 0.0226 |
| 24 | 0.0201 |
| 25 | 0.0179 |
| 26 | 0.0159 |

Figure 5A:
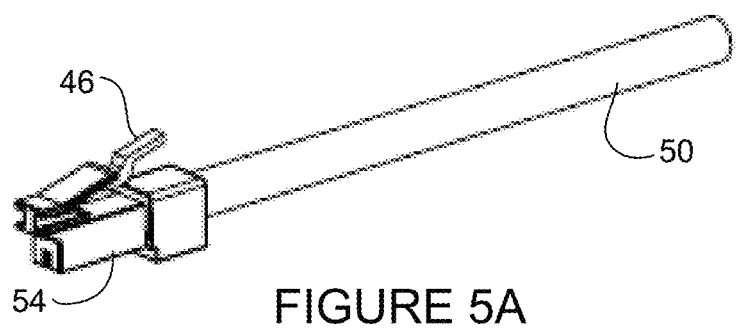
FIG. 5A is a perspective of the latch SPE plug attached to an 18 AWG cable, in accordance with one embodiment.
Figure 5B:
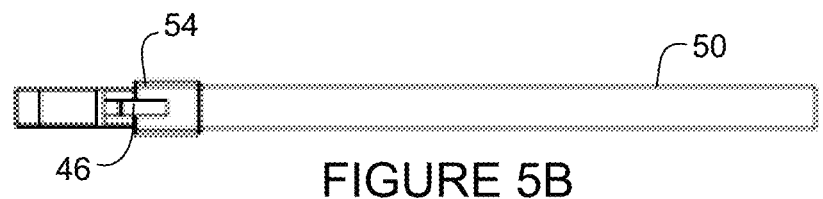
FIG. 5B is a top view of the plug and cable assembly shown in FIG. 5A.
Figure 5C:
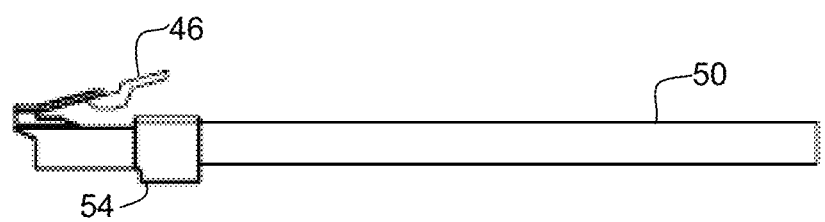
FIG. 5C is a side view of the plug and cable assembly shown in FIG. 5A.
Figure 5D:
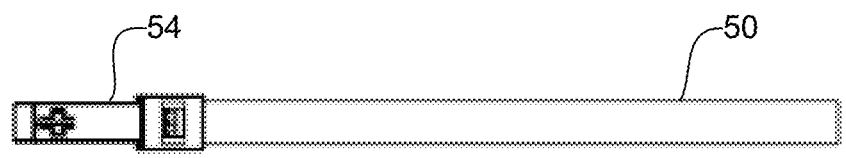
FIG. 5D is a bottom view of the plug and cable assembly shown in FIG. 5A.
Figure 6B:
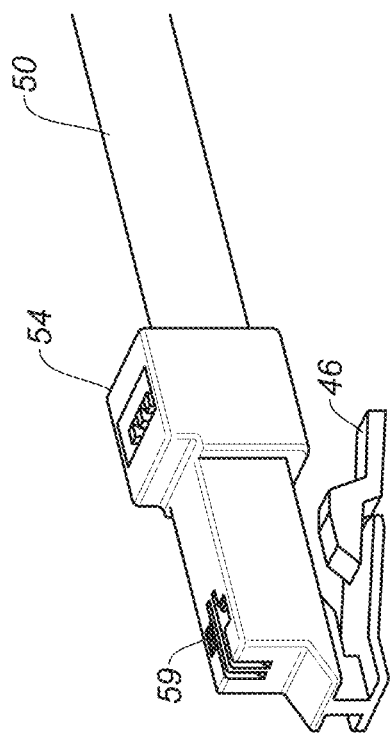
FIG. 6B is a bottom perspective of the plug and cable assembly shown in FIG. 5A.
Figure 6D:
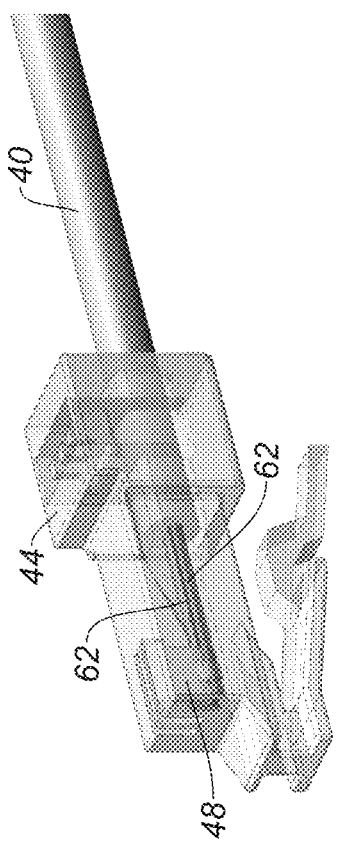
FIG. 6D is a bottom perspective of the plug and cable assembly shown in 4A with parts shown in phantom to illustrate additional details of the plug and conductors.
Figure 6A:
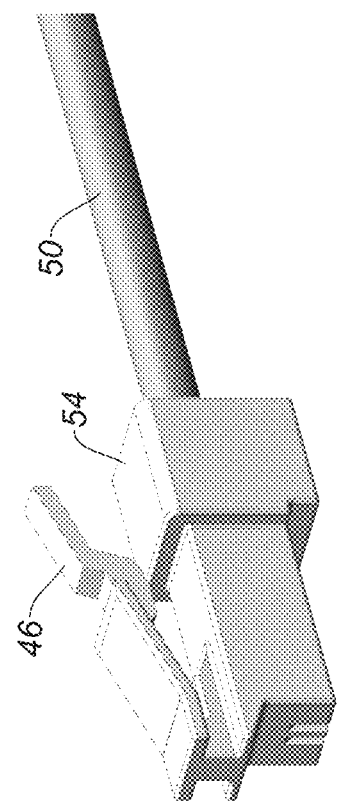
FIG. 6A is a top perspective of the plug and cable assembly shown in FIG. 5A.

FIGS. 6A and 6B are a top perspective and bottom perspective of the plug 54 attached to the 18 AWG cable 50, as shown in FIG. 5A with additional details shown. The plug 54 includes the resilient tab 46 for release of the plug from the receptacle. The tab 46 provides a latching mechanism to retain the plug within the receptacle and a free end extending rearward from the receptacle when the plug is inserted into the receptacle. The free end of the tab 46 may be compressed to release the plug from the receptacle, similar to use of the tab on an RJ45 connector.

Figure 6C:
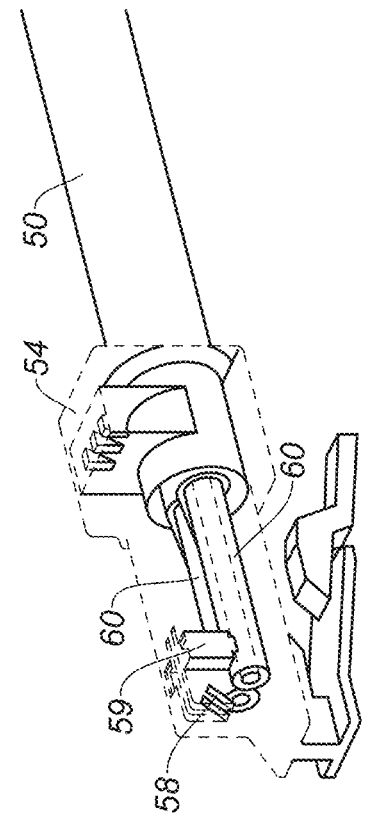
FIG. 6C is a bottom perspective of the plug and cable assembly shown in FIG. 5A with parts shown in phantom to illustrate additional details of the plug and conductors.

FIGS. 6C and 6D are perspectives showing the plug in phantom to illustrate details of the internal conductors and contacts, with the plug attached to the 18 AWG cable in FIG. 6C and the 26 AWG cable 40 in FIG. 6D. The plug 44, 54 includes a pair of contacts 48, 58 for electrical connection with receptacle contacts at a receptacle contact interface.

Figure 11A:
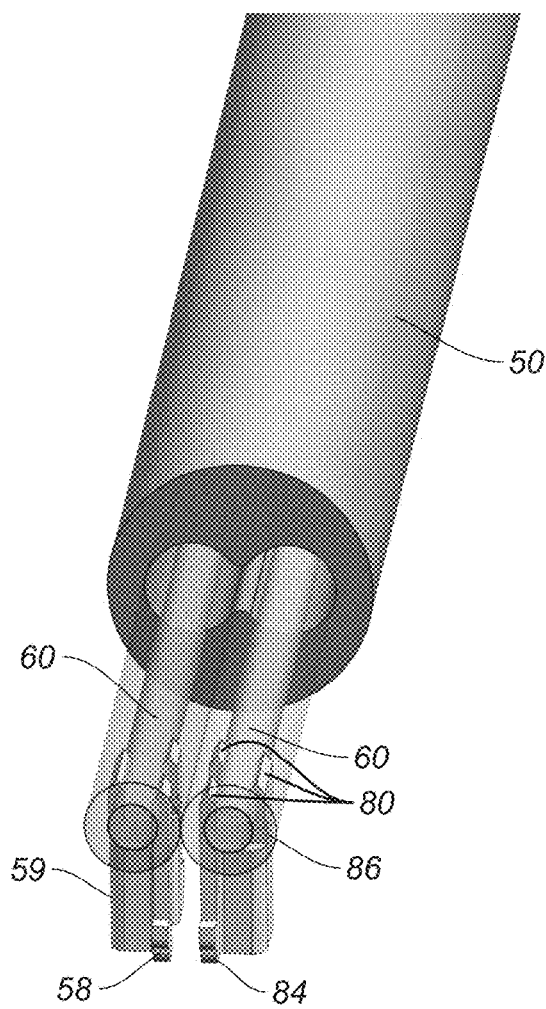
FIG. 11A is a top perspective of the conductors extending from the 18 AWG cable and attached to contacts with the plug removed to show detail.
Figure 11B:
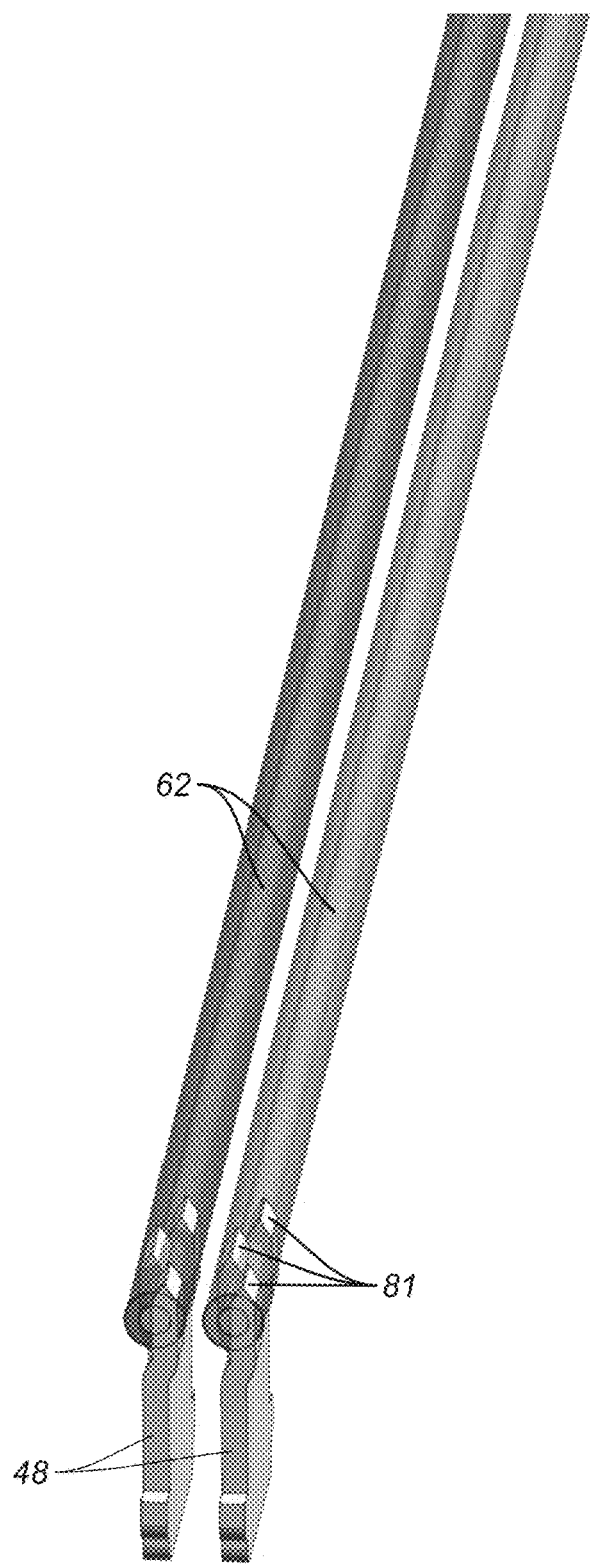
FIG. 11B is a top perspective of contacts attached to the conductors of a 26 AWG cable with the plug removed to show detail.

The contact 48, 58 also has an electrical connection to conductors (wires) 62, 60 in the cable 40, 50 at a conductor interface on the contact. The plug 44, 54 is crimped on the cables 40, 50 to create an electrical contact between the conductors 62, 60 and the plug contacts 48, 58 at a conductor interface. In order to provide consistent spacing between the contacts 48, 58 for different sized cables, the contact 58 for the plug 54 configured to receive a larger diameter cable 50 (e.g., 18 AWG) includes an extension 59 (FIG. 6C) to provide an increased width between conductor gripping prongs (configured to grip the conductor when the contact is crimped onto the conductor as shown in FIG. 11A) at the conductor interface while maintaining a consistent spacing between the pair of contacts at the receptacle contact interface for connector plugs configured to mate with different gauge cables. As shown in FIG. 6D, the plug 44 configured for the smaller diameter cable 40 (e.g., 26 AWG) includes generally flat contacts 48 that have sufficient thickness to allow the prongs to grip the smaller diameter conductors (FIG. 11B). In one example, the extension 59 may comprise a U-shaped member (as viewed from the bottom of the plug as shown in FIGS. 6B and 6C) that provides sufficient spacing between the prongs to receive the conductor 60. The U-shaped members 59 may vary in thickness or shape based on the thickness of the conductors to which the plug is designed to receive.

Figure 7B:
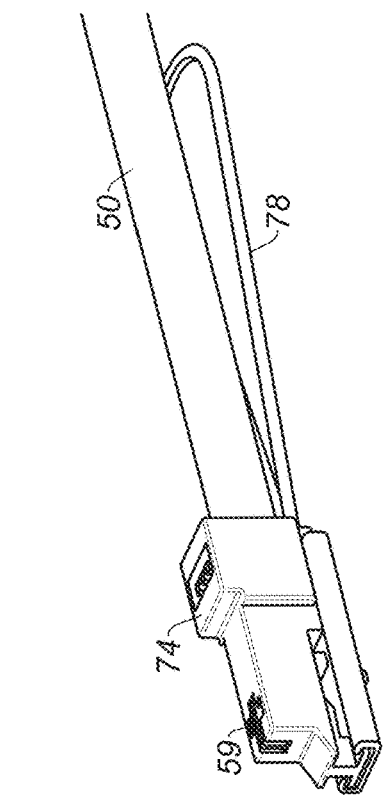
FIG. 7B is a bottom perspective of the plug and cable assembly shown in FIG. 7A.
Figure 7D:
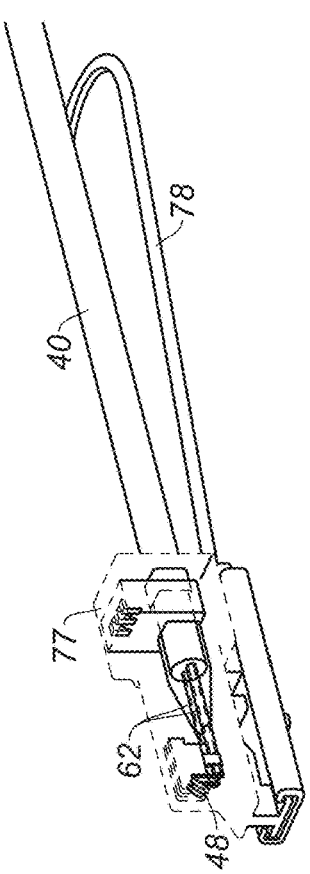
FIG. 7D is a bottom perspective of a pull cord SPE plug and a 26 AWG cable with parts shown in phantom to illustrate additional details of the plug and conductors.
Figure 7A:
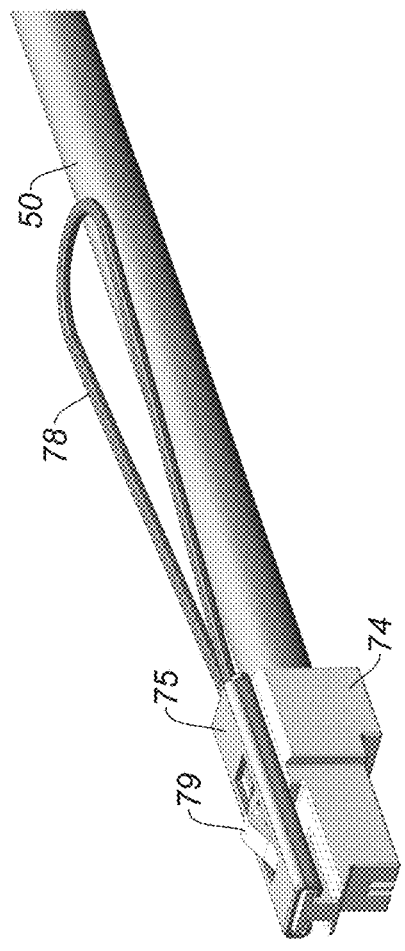
FIG. 7A is a top perspective of the pull cord SPE plug attached to an 18 AWG cable, in accordance with one embodiment.

FIGS. 7A and 7B are a top perspective and a bottom perspective of a pull cord plug 74 and cable 50, in accordance with one embodiment. A pull cord release 78 is attached to the plug 74 to release a latching mechanism 79 located on a top surface of the plug (FIG. 7A). The latching mechanism 79 engages with an internal wall of the receptacle to retain the plug in place. When the plug 74 is inserted into the receptacle and a pull force is exerted in a rearward direction on the pull cord 78, the latching mechanism 79 is depressed by a sliding cover 75 to release the plug 74 from the receptacle.

Figure 7C:
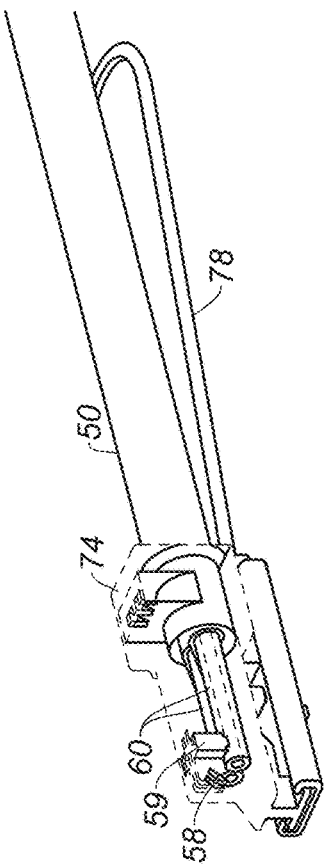
FIG. 7C is a bottom perspective of the plug and cable assembly shown in FIG. 7A with parts shown in phantom to illustrate additional details of the plug and conductors.

FIGS. 7C and 7D are perspectives showing the plug in phantom to illustrate details of the internal conductors and contacts, with the plug 74 attached to the 18 AWG cable 50 in FIG. 7C and a plug 77 attached to the 26 AWG cable 40 in FIG. 7D. As previously described with respect to FIG. 6C, the contacts 58 may each include a width extender 59 to provide sufficient thickness to allow prongs to grip the larger diameter conductors 60 of cable 50.

Figure 8A:
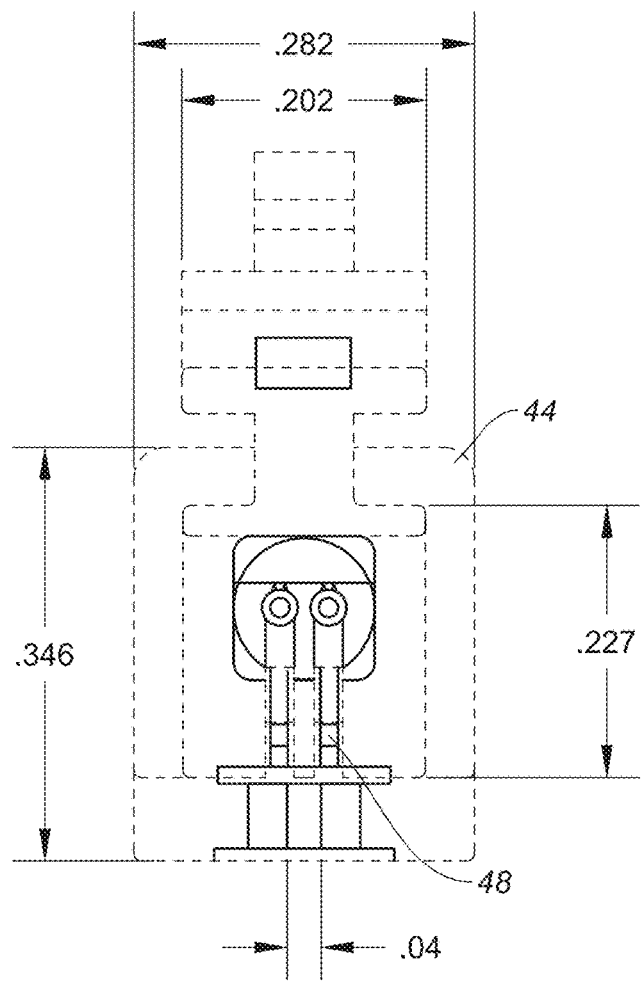
FIG. 8A is a front view of the latch SPE plug and cable shown in FIG. 4A with example dimensions.
Figure 8B:
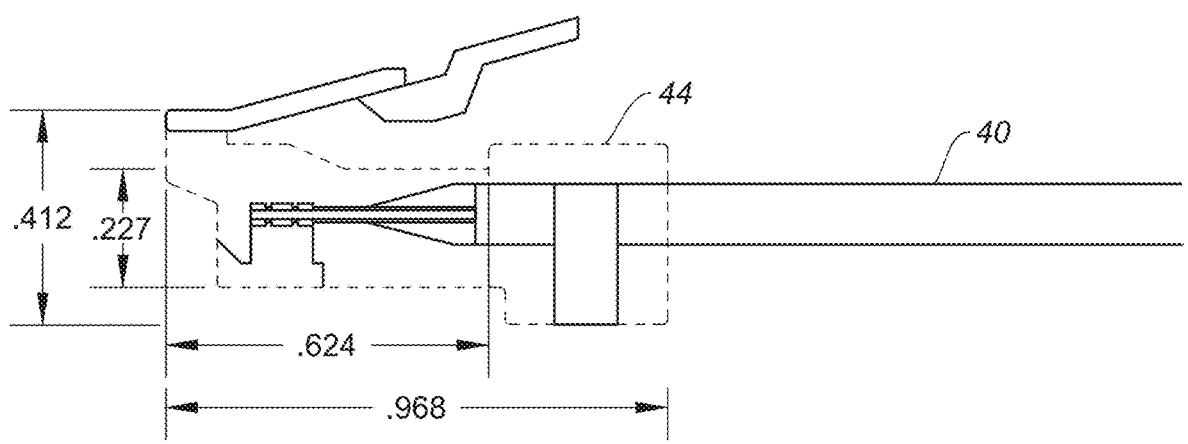
FIG. 8B is a side view of the latch SPE plug and cable shown in FIG. 4A with example dimensions.
Figure 9A:
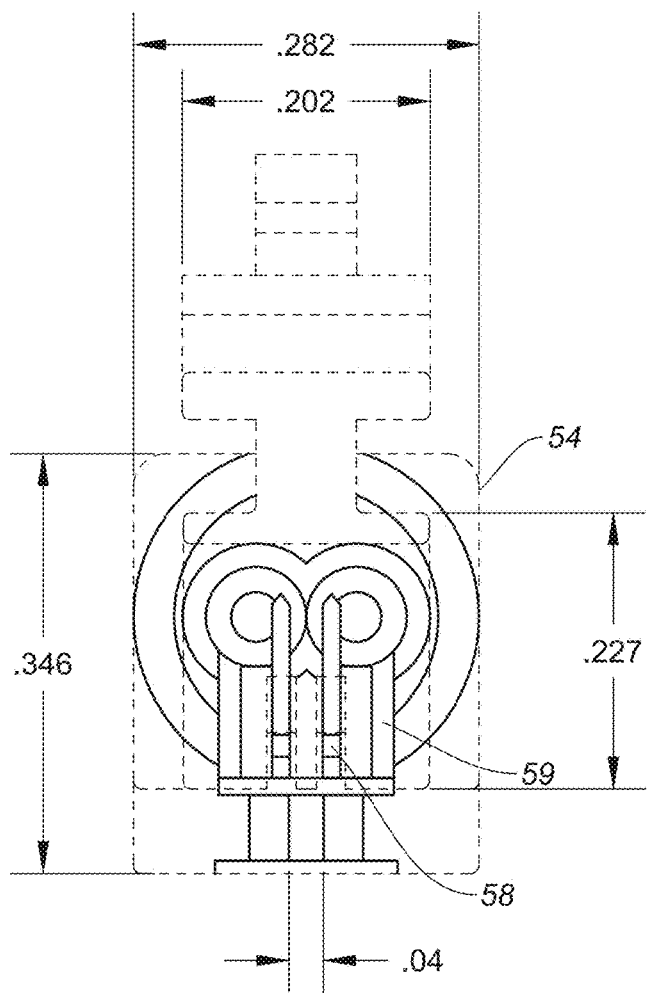
FIG. 9A is a front view of the latch SPE plug and cable shown in FIG. 5A with example dimensions.
Figure 9B:
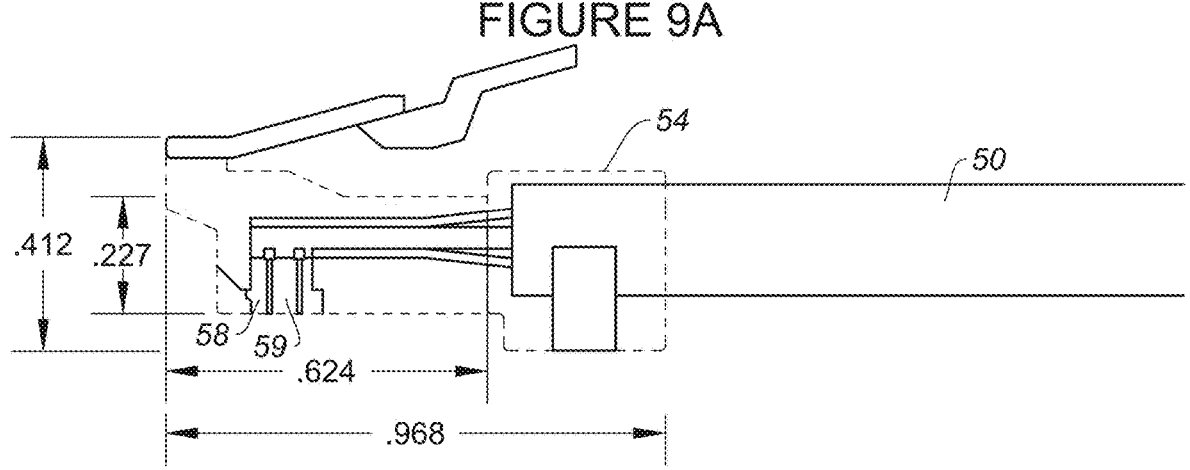
FIG. 9B is a side view of the latch SPE plug and cable shown in FIG. 5A with example dimensions.

FIGS. 8A and 8B are front and side views, respectively, of the plug 44 attached to the 26 AWG cable 40. FIGS. 9A and 9B are front and side views, respectively, of the plug 54 attached to the 18 AWG cable 50. The dimensions shown are provided as examples and more particularly, to show that the external dimensions of the plug and the conductor spacing is the same for different gauge cables. In this example, the contact spacing (pitch) is 0.04 in. It is to be understood that this is only an example and that other spacing dimensions may be used as long as the pitch remains consistent across a specified range of cable sizes (e.g., 18 AWG-26 AWG).

Figure 10A:
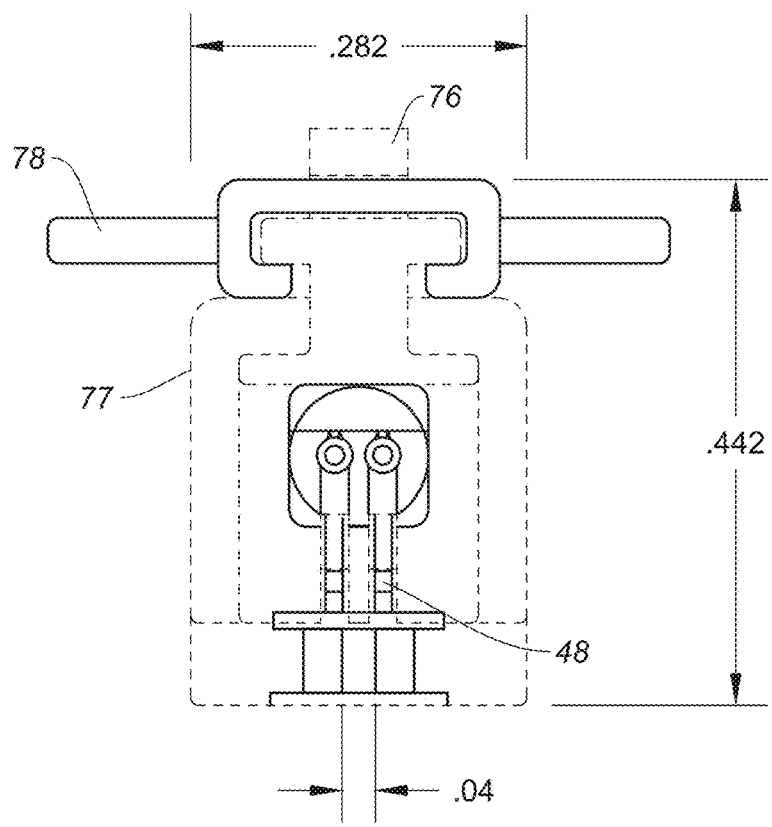
FIG. 10A is a front view of the pull cord SPE plug and cable shown in FIG. 7D with example dimensions.
Figure 10B:
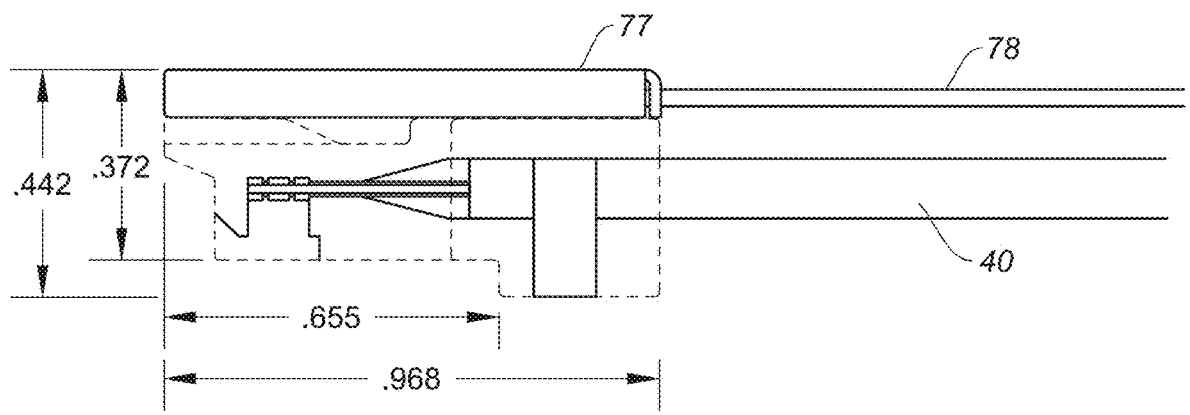
FIG. 10B is a side view of the pull cord SPE plug and cable shown in FIG. 7D with example dimensions.

FIGS. 10A and 10B are front and side views, respectively, of the pull cord plug 77 attached to the 26 AWG cable 40. As described above for the latch plug, the dimensions and pitch are the same for a pull cord plug attached to an 18 AWG cable, or any other gauge cable (e.g., within 18-26 AWG range).

FIGS. 11A and 11B illustrate details of the conductors 60 contained within an 18 AWG cable 50 and conductors 62 contained within a 26 AWG cable, respectively. The plug body is removed to show detail of the connection between the conductors and contacts when the contacts are crimped onto the conductors. In one or more embodiments, the connector is configured as an insulation displacement connector similar to an RJ45 connector to provide field termination of the cable with the connector using a suitable crimping tool. One or more crimping tools may be used to attach the plug to different size cables. For example one crimping tool may be configured with different crimping portions for use with different size cables.

The contact 58 includes a receptacle contact interface at a lower end 84 and a conductor interface at an upper end 86. The conductor interface portion of the contact includes sharp prongs 80 (FIG. 11A), 81 (FIG. 11B) that when crimped, pierce the wire insulation and connect with the conductor 60, 62 through insulation displacement. In the example shown in FIGS. 11A and 11B, the contact 58, 48 includes three prongs 80, 81 to securely surround and grip the conductor 60, 62. Any other suitable crimping arrangement may be used.

As previously described with respect to FIG. 6C, the contacts 58 may include an extension 59 to provide an increased width between conductor gripping prongs 80 at the conductor interface 86 while maintaining a consistent spacing between the pair of contacts at the receptacle contact interface 84 for connector plugs configured to mate with different gauge cables. The extension 59 may comprise, for example, a U-shaped member as described above, or a rib, flange, or other suitable extension member that provides sufficient width between the gripping prongs 80 to securely connect the contact to the larger diameter conductor 60. This allows the contacts to be configured to provide consistent spacing at the receptacle contact interface regardless of the diameter of the conductors. As previously described with respect to FIG. 6D, the contacts 48 shown in FIG. 11B provide sufficient thickness to sufficiently grip the smaller diameter conductors 62 and do not require an extension. Depending on the thickness of the conductor, the contact may be generally flat or have an extension to extend the width between opposing prongs to accommodate any size conductor (e.g., 18 AWG to 26 AWG).

It is to be understood that the plug and cable assemblies shown in FIGS. 4A-11B and described above are only examples and changes may be made without departing from the scope of the embodiments. For example, the plug may have different dimensions than shown in FIGS. 8A-10B or the plugs may connect to different types or gauges of cable, without departing from the scope of the embodiments. Also, the receptacle and mating plug may have any cross-sectional shape (e.g., rectangular, round, etc.). As described above, the embodiments provide a consistent external physical dimension and contact spacing regardless of the cable gauge so that different cables may be connected to the same port.

In one or more embodiments, the connector system may be configured for use outdoors or other harsh environments. For example, one or more components (e.g., plastic boot, cover, case, coupler, gasket/seal) may be added to provide a waterproof connector and may also provide dust protection.

Figure 12A:
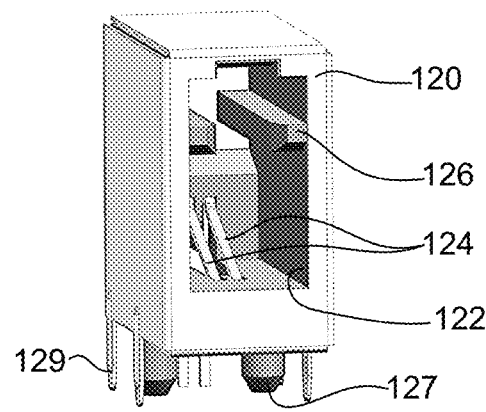
FIG. 12A is a perspective of a receptacle, in accordance with one embodiment.
Figure 12B:
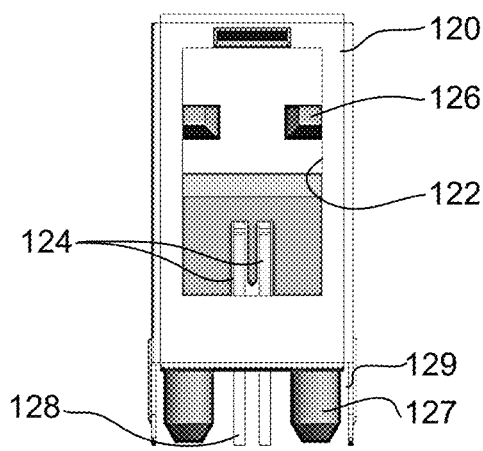
FIG. 12B is a front view of the receptacle shown in FIG. 12A.
Figure 12C:
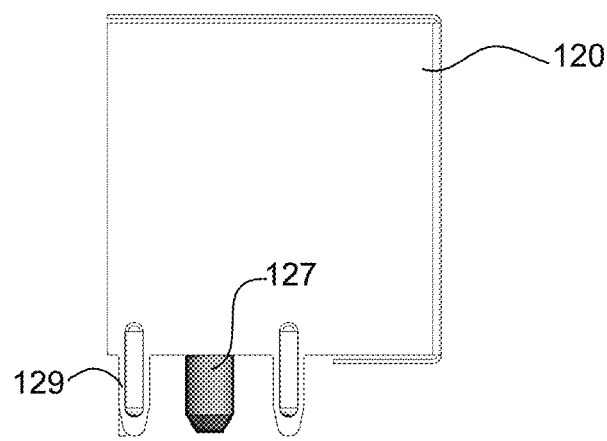
FIG. 12C is a side view of the receptacle shown in FIG. 12A.

FIGS. 12A, 12B, and 12C show a perspective, front view, and side view of an individual receptacle 120 configured for receiving any of the plugs shown in FIGS. 4A-10B. The receptacle 120 may be mounted on a sensor or other IoT device, for example. In one or more embodiments, the connector allows for surface mount or pin-through assembly on the PCB. An opening 122 is formed in a front wall of the port and configured for receiving the mating plug (including the tab or latching mechanism) and retaining the plug and cable assembly. In one or more embodiments, the receptacle comprises stability bars 126 extending inward from internal side walls to guide the plug and hold the plug in place within the receptacle. The bars 126 correspond to slots formed below the tab 46 on the latch plug 44 (FIG. 6A) or sliding cover 75 on the pull cord plug 74 (FIG. 7A). The receptacle includes an insulating body supporting a corresponding pair of contacts 124 that extend upward into the opening 122. Back-end portions of the contacts 124 extend outside the receptacle body for attachment to conductors of a printed circuit board. In the example shown in FIGS. 12A-12C, guide pins 127 extend from a lower surface of the receptacle 120. Pins 129 may also extend from sides of the receptacle body for contact with the PCB.

FIGS. 13A-16B describe a process for mounting a receptacle housing on the printed circuit board, in accordance with one embodiment. In one or more embodiments, the connectors are located above and below the printed circuit board. As described below, connection processes may be performed on one side of the PCB. In one example, connector contacts are reflowed on the top side of the PCB.

Referring first to FIG. 13A, a contact coupling member (bracket, contact strip) 130 is shown attached to a PCB 132 (only a portion of the PCB is shown without circuit or component details). The coupling member 130 comprises a plurality of contact pins. A set 134 of two contact pins may be referred to as a chicklet or 2-pin chicklet. FIG. 13A illustrates a start of the assembly process with the 2-pin chicklets 134 assembled in the bracket 130 to provide a single pair port configuration. In this example, the sets 134 of contact pins are staggered along the bracket 130 with every other set extending upward and remaining sets interposed therebetween extending downward, thereby providing a staggered arrangement of contacts. This allows assembly and processing to be performed on one side of the PCB (e.g., contacts reflowed on top side). Each set 134 of contact pins may be angled relative to the upper or lower surface of the PCB 132, thus allowing compression and a pressure fit when the plug is received into a corresponding receptacle as shown in FIG. 17. The bracket 130 may include any number of chicklets 134 and one or more brackets may be used to extend over the length of the PCB 132. The bracket 130 includes a plurality of openings 135 for receiving mounting pins 152 (upper and lower) as described below with respect to FIG. 16B.

As shown in FIGS. 13A and 13B, the bracket 130 is attached along one edge of the PCB 132. The contact pins 134 extend rearward beyond a lower edge of the bracket 130 to allow soldering of the pins to the PCB 132. The contact pins 134 are in contact with the PCB 132 and held into electrical connective coupling by solder at contact point 138 on an upper surface of the PCB. A mounting portion 139 of the bracket 130 is positioned on an upper surface of the PCB 132 for pressure fit securement with an upper surface of the PCB.

The PCB 132 may also include light generating devices 136 (e.g., LEDs (Light Emitting Diodes) or other light source that may produce light (e.g., one or more colors)) mounted on an upper surface and lower surface of the PCB 132 (FIG. 13B), one corresponding to each 2-pin contact set 134 to provide a status light per port, as described in detail below. Light pipes may be configured such that one end of the light pipe is positioned adjacent to the light generating device 136 when the port is mounted on the board, as described below.

Figure 14:
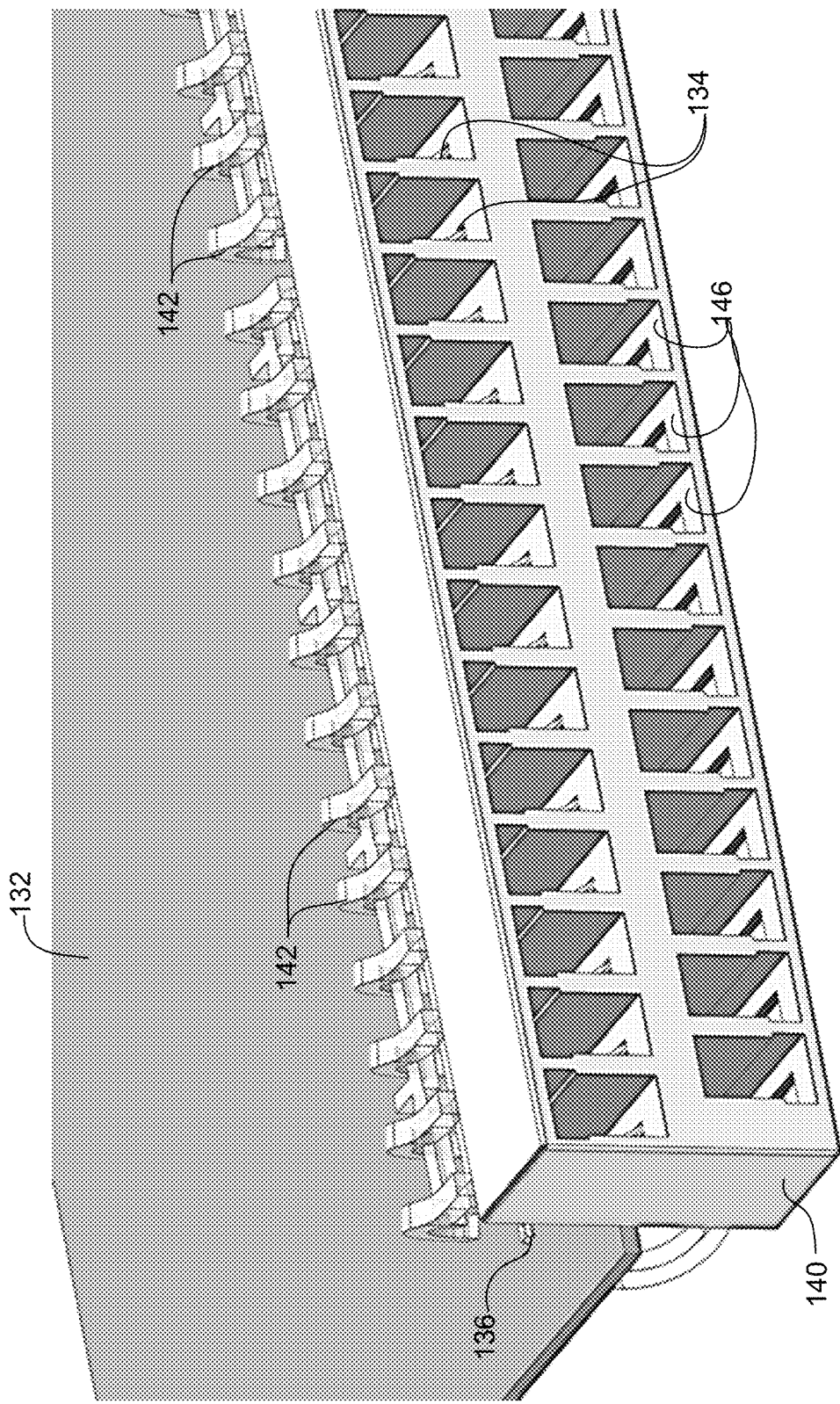
FIG. 14 is a front perspective of the receptacle housing placed over the printed circuit board assembly shown in FIG. 13A.

After the contacts 134 are attached to the PCB 132, a receptacle housing assembly is slid over the PCB assembly, as illustrated in FIG. 14. In one or more embodiments, the receptacle housing assembly comprising a receptacle housing (connector body) 140, light pipes 142, and EMI shield. The receptacle housing 140 comprises a plurality of receptacles 146 for receiving the connector plugs. Each receptacle 146 receives one of the sets 134 of contact pins. Since the sets 134 of contact pins are staggered between upper and lower contact pins, as previously described with respect to FIG. 13A, the receptacles 146 are also offset between lower and upper rows. The light pipes 142 transmit light from the LEDs 136 to a rear opening of the receptacle 146 so that light can pass through the receptacle (e.g., via plug) and provide a visual indication of a status of the port, as described in detail below.

Figure 15A:
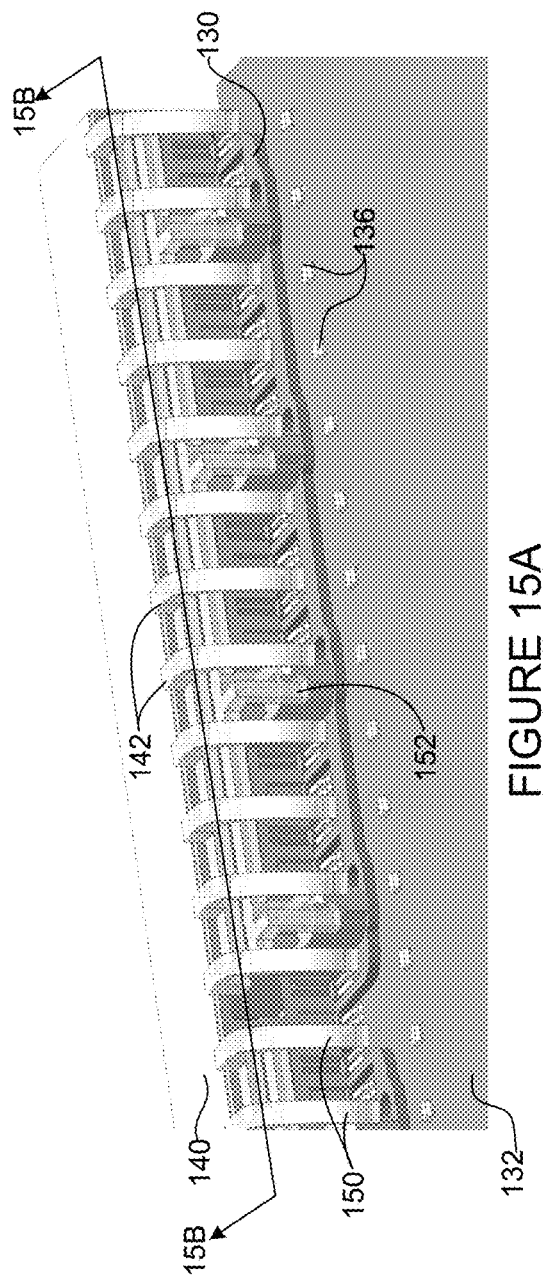
FIG. 15A is a rear perspective of the receptacle housing and printed circuit board assembly shown in FIG. 14.
Figure 15B:
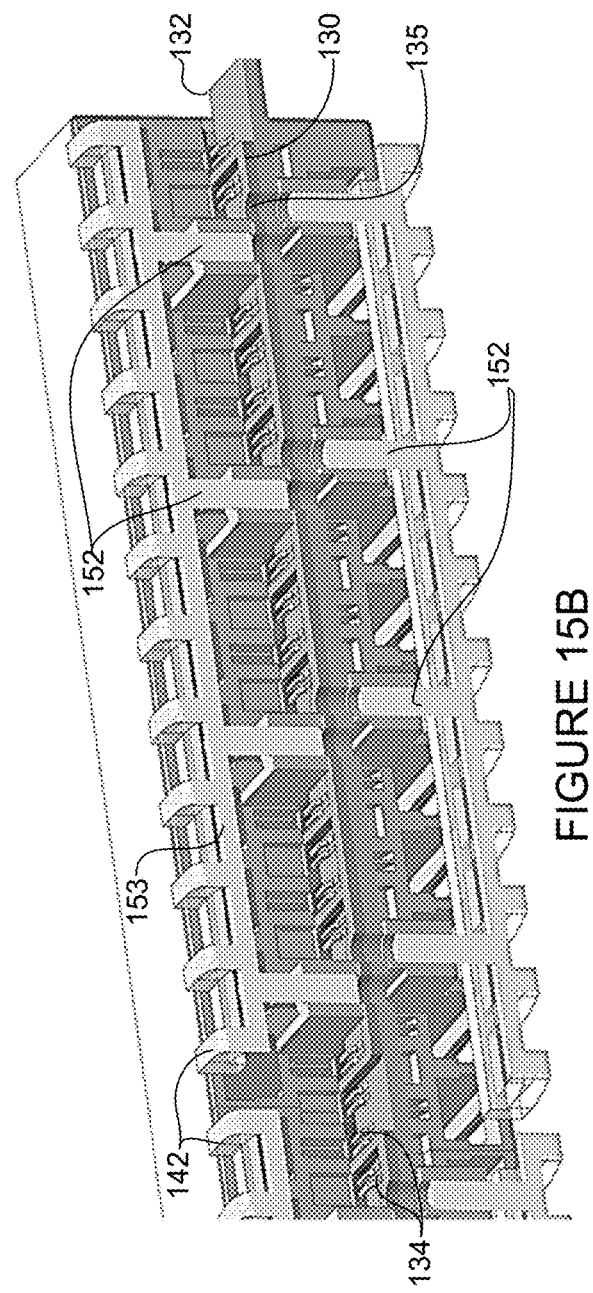
FIG. 15B is a cross-sectional perspective taken through line 15B-15B in FIG. 15A.

FIG. 15A is a rear perspective of the assembly shown in FIG. 14. In this step in the process, the light pipes 142 have an intermediate snap position/location relative to the receptacle housing 140 such that light pipe securing legs (pins) 150 are recessed to allow the receptacle housing assembly to slide over the connector contact bracket 130. The light pipes 142 on each side of the PCB 132 are connected through a bar 153, which also supports a plurality of mounting pins 152 (FIG. 15B). In this position, the mounting pins 152 are spaced from the PCB 132 and aligned with openings 135 in the contact bracket 130 (FIGS. 15A and 15B). The light pipes 142 and mounting pins 152 are moveable between a first position for sliding the housing assembly onto the printed circuit board 132 and a second position for securely connecting the receptacle housing to the printed circuit board.

Figure 16A:
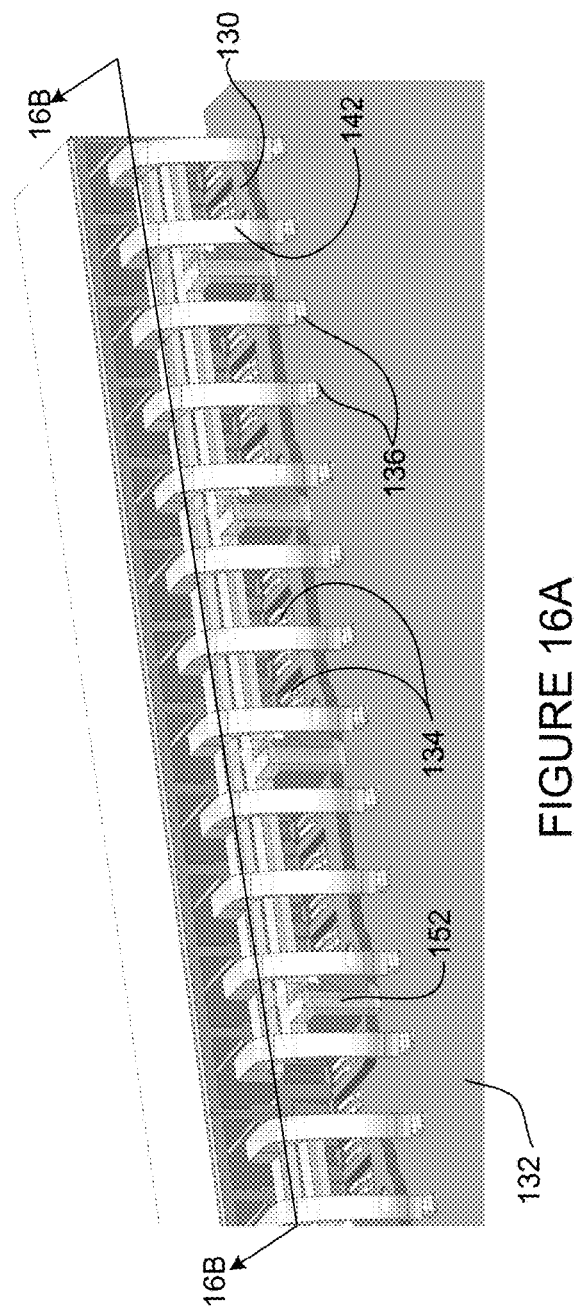
FIG. 16A is a rear perspective of the receptacle housing attached to the printed circuit board assembly shown in FIG. 13A.
Figure 16B:
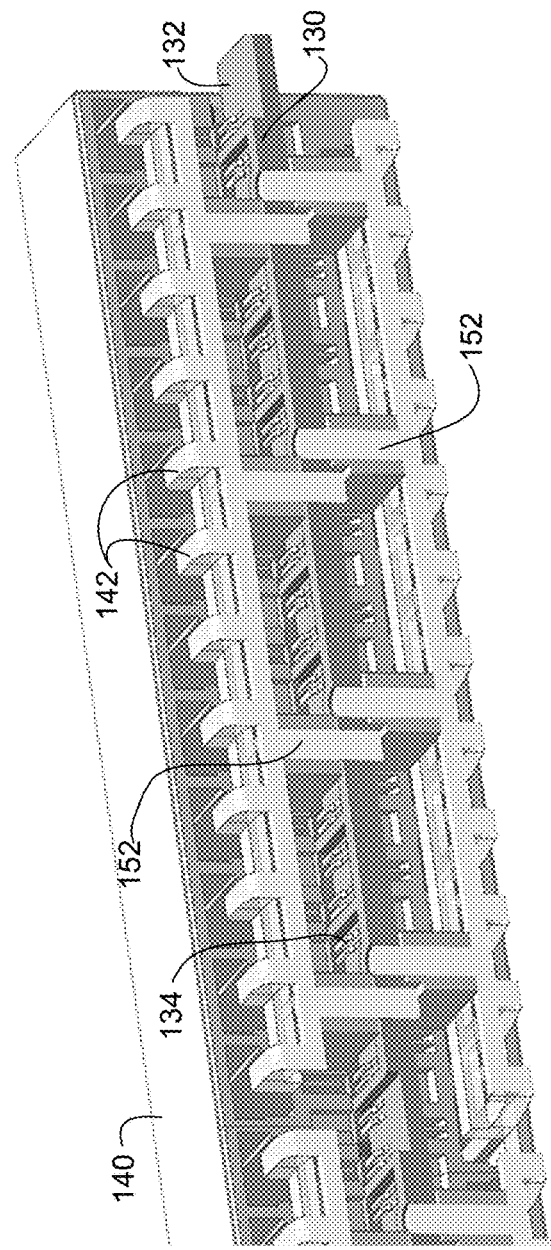
FIG. 16B is a cross-sectional perspective taken through line 16B-16B in FIG. 16A.
Figure 17:
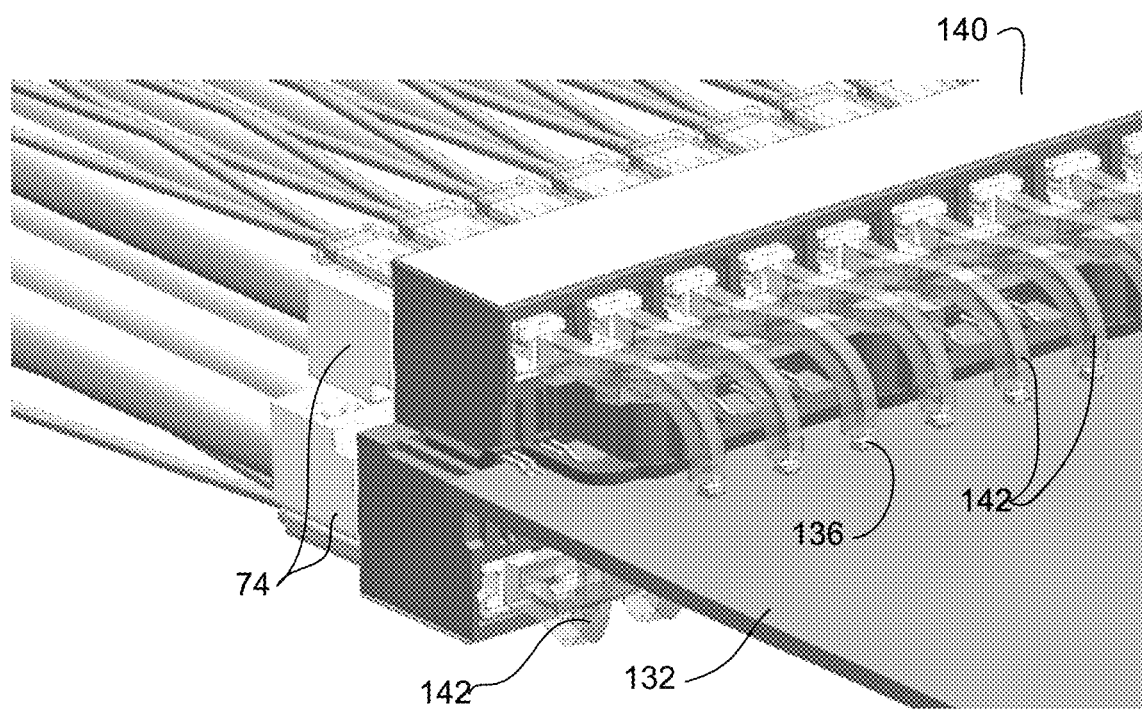
FIG. 17 is a rear perspective illustrating the SPE pull cord plug and cable assemblies inserted into the receptacle housing mounted on the printed circuit board assembly as shown in FIG. 16A.

Once the receptacle housing assembly is installed and properly positioned over the connector contacts 134 and bracket 130, the light pipes 142 are pushed into place thereby driving the mounting pins 152 through the receptacle housing assembly, connector contact bracket 130, and PCB 132 to securely mount the receptacle housing 140 on the PCB (FIGS. 16A and 16B).

One end of the light pipe 142 is now positioned adjacent to the light generating device 136 to enable conveyance of light from the light generating device to the other end of the light pipe adjacent to the plug 74 when inserted into the receptacle (FIG. 17). The light pipe 142 may have a cross-section (e.g., rectangular, oval, circular, or any other geometry) and may be curved as shown in FIG. 17. In one or more embodiments, the plugs 74 are made of clear plastic, which allows the light pipes 142 to shine into plugs thereby illuminating them. In one embodiment, a plastic material of the plug operates as a light pipe to carry light to a location in which a technician can easily view the light as it leaves the plug (e.g., latch, tab, plug body). The plug may be formed, for example, from a clear or semi-transparent material that allows light to pass therethrough (e.g., via internal diffusion or other process) so that it is easily viewable by a technician. For example, the plug 74 may be formed of natural colored polycarbonate, clear polycarbonate, clear acrylic, or any other suitable material.

It is to be understood that the assembly process described above and shown in FIGS. 13A-16B is only an example and variations may be made without departing from the scope of the embodiments. For example, the receptacles may also be configured in an angled format (e.g., to provide right angle access). Also, as previously noted, the receptacle housing may comprise any number of ports.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. An apparatus comprising:
a connector plug for attachment to a single pair Ethernet cable comprising a pair of conductors, and configured for being received in a connector receptacle, the connector plug comprising:
  a first end for receiving the single pair Ethernet cable; and
  a second end comprising a pair of contacts, each of the contacts comprising a receptacle contact interface and a conductor interface;
wherein each of the contacts comprises an extension to provide an increased width between conductor gripping prongs at the conductor interface while maintaining a consistent spacing between the pair of contacts at the receptacle contact interface with connector plugs configured to mate with different gauge cables.

2. The apparatus of claim 1 wherein the single pair Ethernet cable comprises an 18 AWG (American Wire Gauge) cable and said spacing between the pair of contacts at the receptacle contact interface is consistent with a connector plug configured for attachment to a 26 AWG cable.

3. The apparatus of claim 2 wherein external dimensions of the connector plug are consistent with external dimensions of the connector plug configured for attachment to the 26 AWG cable.

4. The apparatus of claim 1 wherein the single pair Ethernet cable carries Power over Ethernet (PoE).

5. The apparatus of claim 1 wherein the connector plug comprises a latch for secure attachment to the receptacle, the latch connected to a tab accessible when the connector plug is inserted into the receptacle for release of the connector plug.

6. The apparatus of claim 1 wherein each of the contacts comprises at least three of the conductor gripping prongs and spacing between the prongs is defined by a U-shaped extension, and wherein the gripping prongs are crimped onto the conductors of the single pair Ethernet cable using insulation displacement.

7. The apparatus of claim 1 wherein said spacing between the pair of contacts at the receptacle contact interface is approximately 0.04 in.

* * * * *